(12) United States Patent
Matsuo et al.

(10) Patent No.: US 7,463,309 B2
(45) Date of Patent: Dec. 9, 2008

(54) DATA SLICER FOR GENERATING A REFERENCE VOLTAGE

(75) Inventors: Rie Matsuo, Hyogo (JP); Kazuo Nomura, Hyogo (JP)

(73) Assignee: Renesas Technology Corp., Chiyoda-Ku, Tokyo (JP)

( * ) Notice: Subject to any disclaimer, the term of this patent is extended or adjusted under 35 U.S.C. 154(b) by 642 days.

(21) Appl. No.: 11/078,500

(22) Filed: Mar. 14, 2005

(65) Prior Publication Data

US 2005/0212962 A1 Sep. 29, 2005

(30) Foreign Application Priority Data

Mar. 29, 2004 (JP) ............................. 2004-094570

(51) Int. Cl.
*H04N 7/00* (2006.01)
*G01R 19/00* (2006.01)
*H03K 5/22* (2006.01)

(52) U.S. Cl. ..................... 348/465; 348/691; 327/60; 327/70

(58) Field of Classification Search ............... 348/465, 348/468, 691, 692; 725/136, 137; 341/155, 341/170; 327/58, 60, 68–70; 375/317
See application file for complete search history.

(56) References Cited

U.S. PATENT DOCUMENTS

| | | | |
|---|---|---|---|
| 5,052,021 A | 9/1991 | Goto et al. | |
| 5,113,077 A * | 5/1992 | Shimizu et al. | ......... 250/370.11 |
| 5,835,045 A | 11/1998 | Ogawa et al. | |
| 6,069,499 A | 5/2000 | Cho et al. | |
| 6,456,170 B1 * | 9/2002 | Segawa et al. | ............... 331/143 |
| 2002/0106038 A1 | 8/2002 | Lee et al. | |
| 2003/0146779 A1 * | 8/2003 | Kao | ........................... 327/157 |

FOREIGN PATENT DOCUMENTS

| | | |
|---|---|---|
| EP | 0 555 970 A2 | 8/1993 |
| JP | 1-164151 | 6/1989 |
| JP | 2-305148 | 12/1990 |
| JP | 6-97787 | 4/1994 |
| JP | 8-204565 | 8/1996 |

(Continued)

*Primary Examiner*—Victor R Kostak
(74) *Attorney, Agent, or Firm*—Buchanan Ingersoll & Rooney PC (57) ABSTRACT

A data slicer of the present invention comprises a reference voltage generation circuit and a comparator. The reference voltage generation circuit comprises a plurality of capacitances which area connected in parallel to one another, holding electrical charges on the basis of an input signal, a plurality of first switches which are connected to the plurality of capacitances with first nodes, respectively, for controlling the inflow of the input signal to the plurality of capacitances and a plurality of second switches which are connected to the plurality of capacitances with the first nodes, respectively, for controlling the connection among the plurality of capacitances. The plurality of first switches are controlled with predetermined timing where these first switches are individually brought into an ON state, and the plurality of second switches are controlled with predetermined timing where all the second switches are brought into an ON state. With this construction, the present invention is intended to provide a data slicer which comprises a reference voltage generation circuit capable of generating an appropriate slicer reference voltage even if the input signal quickly changes.

6 Claims, 5 Drawing Sheets

FOREIGN PATENT DOCUMENTS

| | | |
|---|---|---|
| JP | 10-215285 | 8/1998 |
| JP | 2000-48367 | 2/2000 |
| JP | 2001-189765 | 7/2001 |
| JP | 2001-319422 | 11/2001 |
| JP | 2003-18226 | 1/2003 |

* cited by examiner

DATA SLICER FOR GENERATING A REFERENCE VOLTAGE

BACKGROUND OF THE INVENTION

1. Field of the Invention

The present invention relates to a data slicer and a method of driving the same, and more particularly to generation of reference voltage in the data slicer.

2. Description of the Background Art

There is a case of broadcasting, for example, where digital data is superimposed on a video signal input. In this case, a receiver of broadcasting needs to fetch the superimposed signal to decode the signal into digital data. Therefore, the receiver is provided with a data slicer.

A conventional (background-art) data slicer consists of a reference voltage generation circuit and a comparator circuit for comparing a reference voltage with an input signal. The reference voltage generation circuit generates a reference voltage on the basis of the input signal.

Specifically, when clock run-in of an input signal starts, an RC integration circuit included in the reference voltage generation circuit integrates the input signal. A value obtained by the RC integration circuit is a reference voltage.

The comparator circuit compares the obtained reference voltage with the input signal to take out a superimposed signal. Patent Document 1, Japanese Patent Application Laid Open Gazette No. 2001-189765, discloses this conventional data slicer.

The conventional data slicer has a problem of taking too much time to obtain the reference voltage since it uses the RC integration circuit to generate the reference voltage. In a case where an input signal quickly changes, particularly, the RC integration circuit can not follow this quick change and this arises a problem of not appropriately generating a reference voltage. Further, some of the conventional data slicers need a large capacity for holding the reference voltage outside the reference voltage generation circuit. For example, if the capacity used for the RC integration circuit is about 40 pF, the capacity provided outside is about 1000 pF. This disadvantageously increases the circuit scale of data slicer.

SUMMARY OF THE INVENTION

It is an object of the present invention to provide a data slicer including a reference voltage generation circuit capable of generating an appropriate reference voltage even in a case where an input signal quickly changes.

The present invention is intended for a data slicer. According to an aspect of the present invention, the data slicer includes a reference voltage generation circuit for generating a reference voltage, and a comparator circuit for comparing the reference voltage with an input signal. The reference voltage generation circuit includes a plurality of capacitances connected in parallel to one another, holding electrical charges on the basis of the input signal, a plurality of first switches connected to the plurality of capacitances with first nodes, respectively, for controlling the inflow of the input signal to the plurality of capacitances, and a plurality of second switches connected to the plurality of capacitances with the first nodes, respectively, for controlling the connection among the plurality of capacitances. The plurality of first switches are controlled with predetermined timing where the first switches are individually brought into an ON state. The plurality of second switches are controlled with predetermined timing where all the second switches are brought into an ON state.

The data slicer of this present invention produces an effect of generating an appropriate slicer reference voltage since the reference voltage generation circuit can adequately follow a change of an input signal if the input signal quickly changes.

According to another aspect of the present invention, the data slicer includes a reference voltage generation circuit for generating a reference voltage, and a chopper amplifier circuit for comparing the reference voltage with an input signal. The reference voltage generation circuit includes a plurality of capacitances connected in parallel to one another and connected to the chopper amplifier circuit with a second node, holding electrical charges on the basis of the input signal, a first switch for controlling the inflow of the input signal, and a plurality of second switches for controlling the respective connections between the first switch and the plurality of capacitances. The plurality of second switches are controlled with predetermined timing where the second switches are individually brought into an ON state, and controlled with predetermined timing where all the second switches are brought into an ON state.

Since the data slicer of this present invention uses a chopper amplifier circuit instead of a comparator circuit, it is possible to produce an effect of further size-reduction in circuit scale of the data slicer.

These and other objects, features, aspects and advantages of the present invention will become more apparent from the following detailed description of the present invention when taken in conjunction with the accompanying drawings.

DESCRIPTION OF THE PREFERRED EMBODIMENTS

The First Preferred Embodiment

Figure 1:
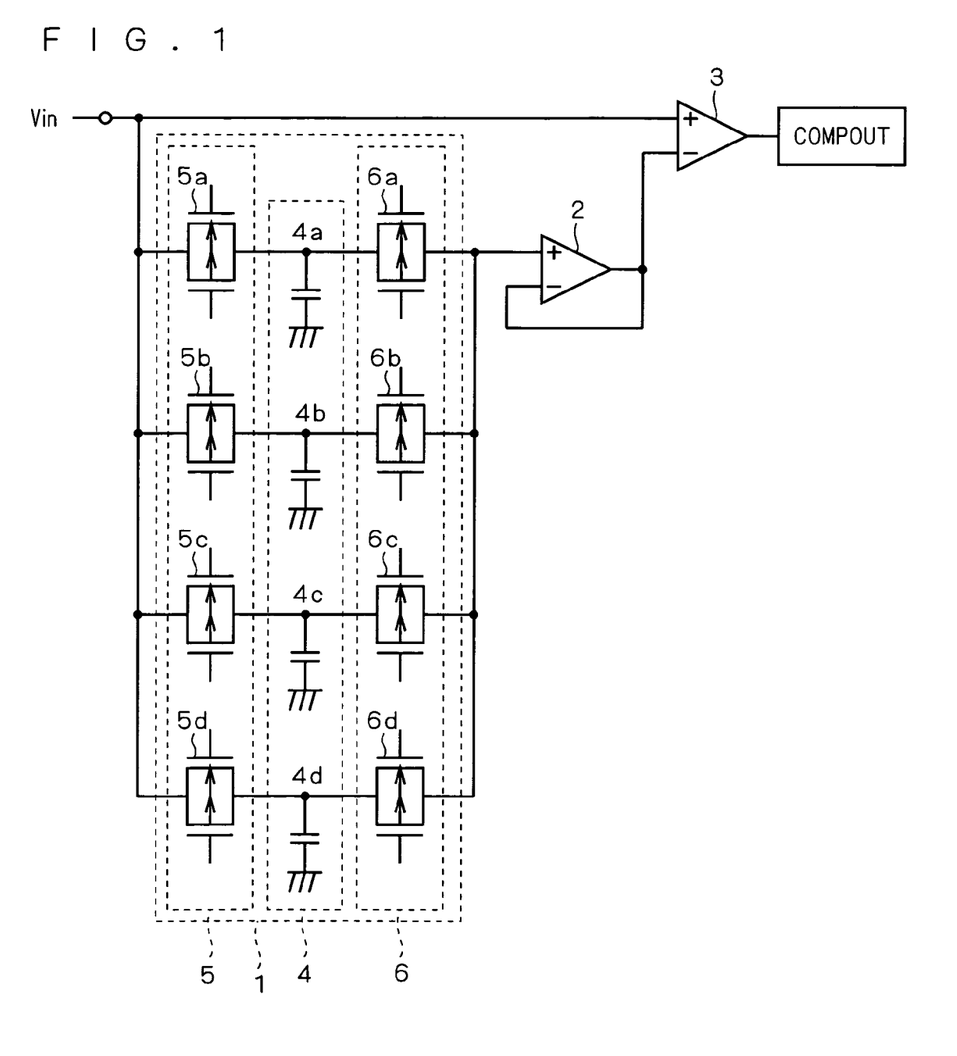
FIG. 1 is a circuit diagram showing a data slicer in accordance with a first preferred embodiment of the present invention.

FIG. 1 is a circuit diagram showing a data slicer in accordance with the first preferred embodiment of the present invention. The data slicer of FIG. 1 consists of a reference voltage generation circuit 1, a buffer 2 and a comparator 3. An input signal Vi inputted to the data slicer is supplied for the (+) side of the comparator 3 and the reference voltage generation circuit 1.

The reference voltage generation circuit 1 generates a slicer reference voltage on the basis of the supplied input signal Vin. In the data slicer of the first preferred embodiment, the slicer reference voltage is once held in the buffer 2 and then supplied for the (−) side of the comparator 3. The comparator 3 compares the supplied input signal Vin with the slicer reference voltage and outputs the comparison result.

The reference voltage generation circuit 1 consists of a plurality of capacitances 4 holding electric charges on the basis of the input signal Vin, a plurality of switches 5 for controlling the inflow of the input signal Vin to the capacitances 4 and a plurality of switches 6 for controlling the connection among the plurality of capacitances 4. In the reference voltage generation circuit 1, the plurality of capacitances 4, switches 5 and switches 6 are connected in parallel to one another, respectively. One end of each capacitance 4 is connected to the switches 5 and 6 with one node and the other end is grounded.

FIG. 1 shows a construction of the reference voltage generation circuit 1 in which four capacitances 4a to 4d, four switches 5a to 5d and four switches 6a to 6d are connected in parallel to one another, respectively. This construction of the reference voltage generation circuit 1 shown in FIG. 1 is one example, and the number of capacitances 4 and switches 5 and 6 is not limited to four but only has to be more than one.

In the reference voltage generation circuit 1 of the first preferred embodiment, the switches 5 control the inflow of the input signal Vin to the capacitances 4, and each of the plurality of capacitances 4 holds the electric charges on the basis of the input signal Vin. Further, in the reference voltage generation circuit 1 of the first preferred embodiment, by turning on all the switches 6, the plurality of capacitances 4 are all connected to one another and the held electric charges are thereby equated.

The reference voltage generation circuit 1 supplies the buffer 2 with a potential on the basis of the equated electric charges as a slicer reference voltage. The reference voltage generation circuit 1 of the first preferred embodiment does not use the RC integration circuit discussed in the background art. Therefore, if the input signal Vin quickly changes, the reference voltage generation circuit 1 can adequately follow the change. Further, the reference voltage generation circuit 1 of the first preferred embodiment only has to be provided with a plurality of capacitances and does not need a large capacity to hold the slicer reference voltage.

Figure 2:
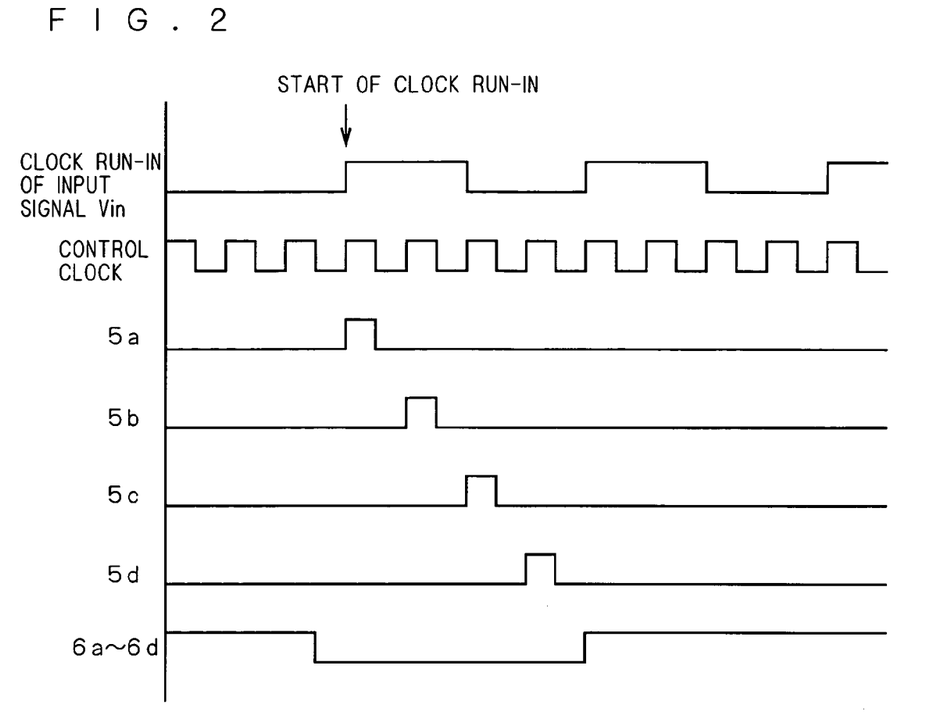
FIG. 2 is a timing chart of the data slicer in accordance with the first preferred embodiment of the present invention.

Next, discussion will be made on an operation of the data slicer (especially, the reference voltage generation circuit 1) of the first preferred embodiment. FIG. 2 is a timing chart of the data slicer in accordance with the first preferred embodiment of the present invention. The timing chart of FIG. 2 shows a signal used for bit synchronization (hereinafter, referred to as clock run-in) of the input signal Vin, a control clock for the switches 5 and 6 and the states of the switches 5 and 6. Since the construction of FIG. 1 includes four switches 5a to 5d, the respective states of the switches 5a to 5d are shown in the timing chart of FIG. 2.

The reference voltage generation circuit 1 of the first preferred embodiment drives the switches 5a to 5d so that each of these switches comes into an ON state once during one cycle of the clock run-in or several cycles. For such a driving, the control clock for the switches 5 and 6 needs to have a frequency higher than the clock run-in. In the timing chart of FIG. 2, the control clock is set to have four cycles during one cycle of the clock run-in. The rise of the clock run-in is synchronized with the rise of the control clock.

On the basis of the control clock, the reference voltage generation circuit 1 controls the switches 5 and 6. First, at the start of clock run-in, the switch 5a is brought into an ON state in synchronization with the control clock. With the switch 5a turned on, the capacitance 4a connected to the switch 5a holds electric charges on the basis of the input signal Vin. The timing where the switch 5a is in the ON state is half cycle of the control clock.

After the switch 5a comes into an OFF state, the switch 5b is brought into an ON state at the timing of rise of the control clock. With the switch 5b turned on, the capacitance 4b connected to the switch 5b holds electric charges on the basis of the input signal Vin. The timing where the switch 5b is in the ON state is half cycle of the control clock.

After the switch 5b comes into an OFF state, the switch 5c is brought into an ON state at the timing of rise of the control clock. With the switch 5c turned on, the capacitance 4c connected to the switch 5c holds electric charges on the basis of the input signal Vin. The timing where the switch 5c is in the ON state is half cycle of the control clock.

After the switch 5c comes into an OFF state, the switch 5d is brought into an ON state at the timing of rise of the control clock. With the switch 5d turned on, the capacitance 4d connected to the switch 5d holds electric charges on the basis of the input signal Vin. The timing where the switch 5d is in the ON state is half cycle of the control clock.

As discussed above, during the four cycles of the control clock (one cycle of the clock run-in), the switches 5a to 5d are brought into an ON state without overlap. The four switches are not necessarily driven in such an order as shown in the timing chart of FIG. 2, i.e., from the switch 5a to the switch 5d, but may be driven in no particular order only if these switches are turned on once during predetermined timing (four cycles of the control clock in the first preferred embodiment) without overlap.

The switches 6a to 6d are in an OFF state while the switches 5a to 5d are driven. In the timing chart of FIG. 2, prior to the start of the clock run-in by half cycle of the control clock, all the switches 6a to 6d come into an OFF state. Then, after the switch 5d is turned off, all the switches 6a to 6d are brought into an ON state at the timing of rise of the control clock.

With all the switches 6a to 6d turned on, all the capacitances 4a to 4d are connected to one another and the respective electric charges in the capacitances 4a to 4d are equated. A potential on the basis of the equated electric charges in the capacitances 4a to 4d are supplied to the buffer 2 as a slicer reference voltage.

In summary of the above discussion, the data slicer of the first preferred embodiment performs the following driving method. First, during predetermined timing (during four cycles of the control clock in this preferred embodiment) after the start of input of the input signal Vin (the start of the clock run-in), the switches 5a to 5d are so controlled as to individually come into an ON state without overlap, to thereby hold predetermined electric charges in the capacitances 4a to 4d, respectively (Step (a)). Next, after Step (a), all the switches 6a to 6d are so controlled as to simultaneously come into an ON state, to thereby equate the electric charges held in the plurality of capacitances 4a to 4d (Step (b)). The comparator 3 compares a slicer reference voltage which is the potential on the basis of the predetermined electric charges equated in Step (b) with the input signal Vin (Step (c)).

The amount of predetermined electric charges held in each of the capacitances 4a to 4d depends on the capacity and the time for charge. The capacities of the capacitances 4a to 4d may be equal to one another or may be different with weighting.

Thus, the data slicer of the first preferred embodiment comprises the reference voltage generation circuit 1 for generating a slicer reference voltage and the comparator 3 for comparing the slicer reference voltage with the input signal.

The reference voltage generation circuit 1 comprises the plurality of capacitances 4a to 4d which are connected in parallel to one another, holding electric charges on the basis of the input signal, a plurality of switches 5a to 5d which are connected to the plurality of capacitances 4a to 4d, respectively, for controlling the inflow of the input signal to the plurality of capacitances 4a to 4d and the plurality of switches 6a to 6d which are connected to the plurality of capacitances 4a to 4d, respectively, for controlling the connection among the plurality of capacitances 4a to 4d. The plurality of switches 5a to 5d are controlled with predetermined timing where these switches 5a to 5d individually come into an ON state without overlap and the plurality of switches 6a to 6d are controlled with predetermined timing where all the switches 6a to 6d simultaneously come into an ON state. With such construction and operation, the data slicer can produce an effect of generating an appropriate slicer reference voltage since the reference voltage generation circuit 1 can adequately follow the change of the input signal even if the input signal quickly changes. Further, having the plurality of capacitances 4a to 4d, the data slicer of the first preferred embodiment eliminates the necessity for separately providing a large capacitance to hold the slicer reference voltage, unlike the conventional (background-art) data slicer.

In the data slicer of the first preferred embodiment, since the plurality of capacitances 4a to 4d have uniform capacity, it is possible to generate a potential on the basis of the average value of total amount of electric charges accumulated in the capacitances 4a to 4d as a slicer reference voltage.

Further in the data slicer of the first preferred embodiment, since the plurality of capacitances 4a to 4d can each have capacity which depends on predetermined weighting, it is possible to generate a potential on the basis of a desired amount of electric charges as a slicer reference voltage.

The Second Preferred Embodiment

A data slicer of the second preferred embodiment has a constitution in which a circuit for selecting a control clock for the switches 5 and 6 is additionally provided to the data slicer of the first preferred embodiment. In the first preferred embodiment, as shown in FIG. 2, four cycles of the control clock correspond to one cycle of the clock run-in. In a case where a data slicer is used in a display device or the like, however, the frequency of the clock run-in changes due to the difference of video system. Among the video systems are PAL (Phase Alternation by Line) system and NTSC (National Television System Committee) system.

When the frequency of the clock run-in changes, it is necessary to change the control clock in response thereto. Then, the data slicer needs a control clock selection circuit as shown in FIG. 3.

Figure 3:
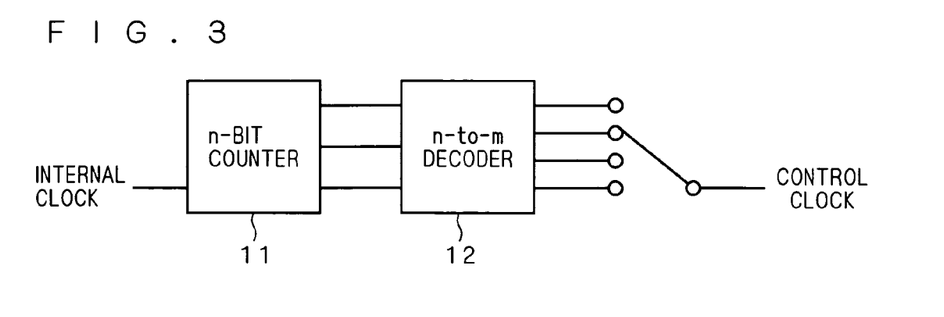
FIG. 3 is a block diagram showing a control clock selection circuit in accordance with a second preferred embodiment of the present invention.

FIG. 3 is a block diagram showing a control clock selection circuit provided in the data slicer in accordance with the second preferred embodiment. The control clock selection circuit of FIG. 3 comprises an n-bit counter 11 and an n-to-m decoder 12.

The n-bit counter 11 is a circuit for generating a signal obtained by dividing an internal clock into 2 to $n^2$ at timing when the internal clock is inputted to the data slicer. The n-to-m decoder 12 is a decoder for selecting a signal to be used as a control clock out of n signals generated by the n-bit counter 11. Therefore, the n-to-m decoder 12 changes the frequency of the control clock to an optimum frequency in response to the change in frequency of the clock run-in and supplies the control clock with the optimum frequency to the switches 5 and 6.

Thus, in the data slicer of the second preferred embodiment, since the control clock serving as control timing for ON/OFF state of the switches 5 and 6 is supplied for the switches 5 and 6 and the reference voltage generation circuit 1 further comprises the control clock selection circuit for changing the frequency of the control clock, it is possible to select an optimum frequency of the control clock in accordance with the video system and increase general versatility of the data slicer.

The Third Preferred Embodiment

Figure 4:
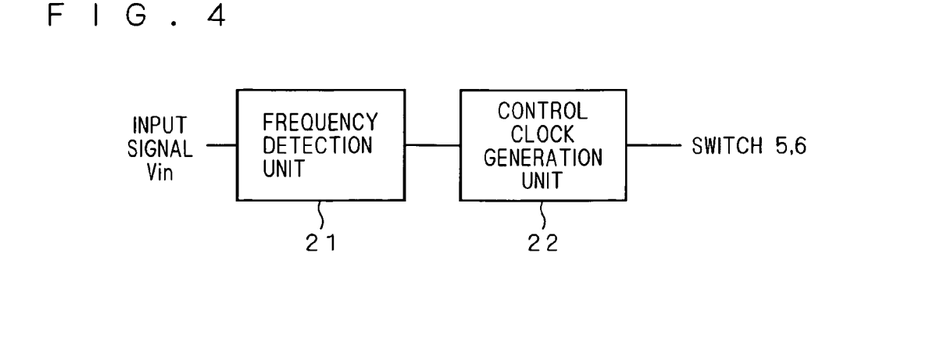
FIG. 4 is a block diagram showing a frequency detection unit and a control clock generation unit in accordance with a third preferred embodiment of the present invention.

A data slicer of the third preferred embodiment has a constitution in which a frequency detection unit and a control clock generation unit are additionally provided to the data slicer of the first preferred embodiment. FIG. 4 is a block diagram showing a frequency detection unit 21 and a control clock generation unit 22 in accordance with the third preferred embodiment.

The frequency detection unit 21 detects a frequency of the input signal Vin. The control clock generation unit 22 generates a control clock to be supplied for the switches 5 and 6 on the basis of the frequency of the input signal Vin detected by the frequency detection unit 21.

Figure 5:
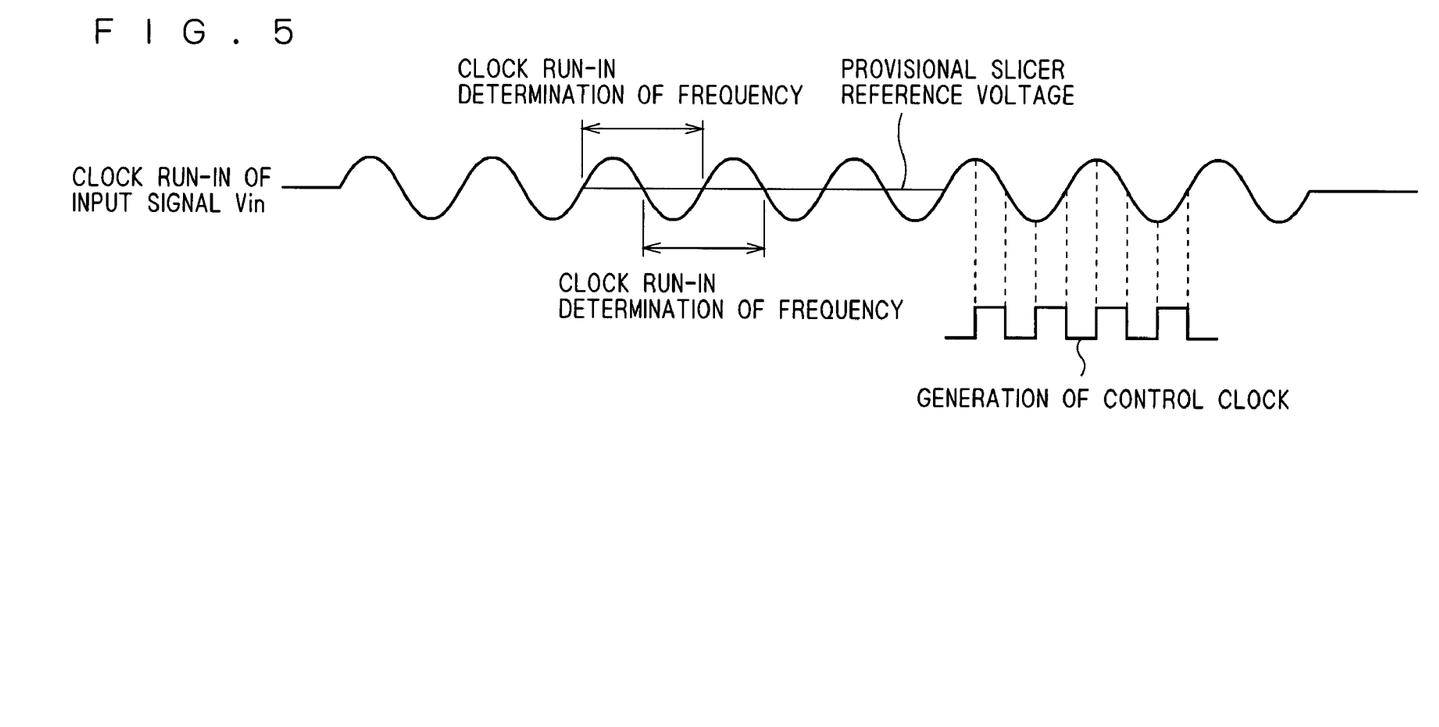
FIG. 5 is a timing chart of the frequency detection unit and the control clock generation unit in accordance with the third preferred embodiment of the present invention.

Specific operation of the frequency detection unit 21 and the control clock generation unit 22 will be discussed. FIG. 5 is a timing chart of the input signal Vin and the like. First, when the clock run-in of the input signal Vin is inputted to the data slicer, a provisional slicer reference voltage is generated for the clock run-in of the first one cycle or several cycles by using the method of the first preferred embodiment. In the timing chart of FIG. 5, the provisional slicer reference voltage is generated on the basis of two cycles of clock run-in.

The frequency detection unit 21 detects a rising edge and a falling edge of the clock run-in with reference to this provisional slicer reference voltage. Then, the frequency detection unit 21 obtains a frequency of the clock run-in from the rising edges and falling edges of several cycles of the clock run-in (about three cycles in FIG. 5). A circuit for detecting the rising edge and the falling edge of the clock run-in in the frequency detection unit 21 can be achieved by using a well-known edge detection circuit.

The control clock generation unit 22 generates an optimum control clock on the basis of the frequency of the clock run-in detected by the frequency detection unit 21. Among exemplary methods of obtaining an optimum control clock by the control clock generation unit 22 are multiplication of the frequency of the clock run-in and selection of an optimum control clock by using the control clock selection circuit of the second preferred embodiment which is provided in the control clock generation unit 22. As still another method, the control clock generation unit 22 uses a pulse which is obtained by delaying the detected rising edges and falling edges by a predetermined time, to obtain an optimum control clock.

The timing chart of FIG. 5 shows a control clock obtained by the control clock generation unit 22. The control clock of FIG. 5 has a frequency higher than that of the clock run-in, specifically, about as twice as that of the clock run-in.

Thus, since the data slicer of the third preferred embodiment comprises the frequency detection unit 21 for detecting the frequency of the clock run-in of the input signal Vin and the control clock generation unit 22 for generating the control clock to be supplied for the switches 5 and 6 on the basis of the frequency detected by the frequency detection unit 21, it is possible to generate a slicer reference voltage on the basis of the control clock in conformity with the actual input signal Vin and therefore possible to increase the accuracy of the slicer reference voltage.

The Fourth Preferred Embodiment

Figure 6:
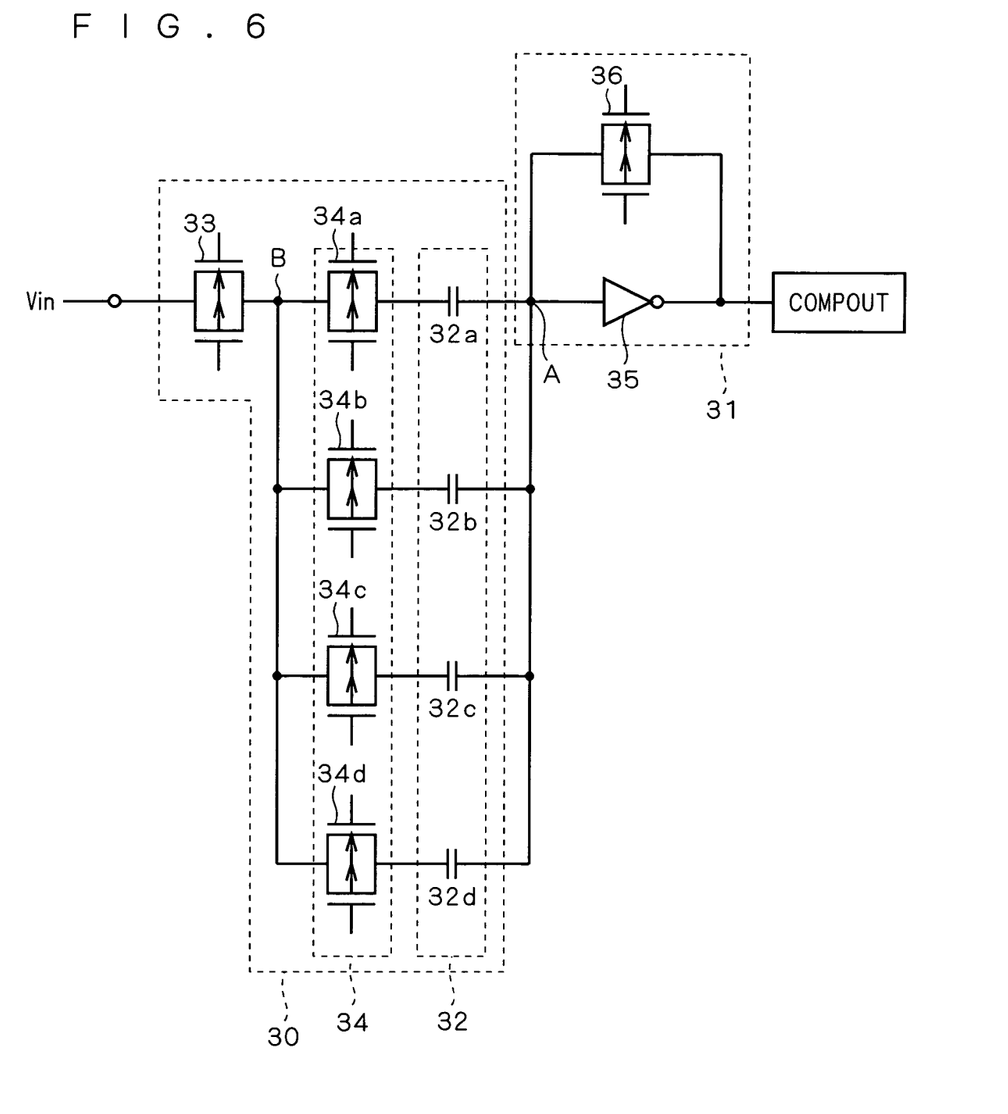
FIG. 6 is a circuit diagram showing a data slicer in accordance with a fourth preferred embodiment of the present invention.

A data slicer of the fourth preferred embodiment has a constitution in which a chopper amplifier circuit is used instead of the comparator 3 used in the data slicer of the first preferred embodiment. FIG. 6 is a circuit diagram showing a data slicer in accordance with the fourth preferred embodiment of the present invention. The data slicer of FIG. 6 consists of a reference voltage generation circuit 30 and a chopper amplifier circuit 31. First, the input signal Vin inputted to the data slicer is supplied for the reference voltage generation circuit 30.

The reference voltage generation circuit 30 generates a slicer reference voltage on the basis of the supplied input signal is Vin and supplies the slicer reference voltage to the chopper amplifier circuit 31. The chopper amplifier circuit 31 compares the supplied input signal Vin with the slicer reference voltage and outputs the comparison result.

The reference voltage generation circuit 30 consists a plurality of capacitances 32 for holding electric charges on the basis of the input signal Vin, a switch 33 for controlling the inflow of the input signal Vin and a plurality of switches 34 for controlling respective connections between the switch 33 and the plurality of capacitances 32. In the reference voltage generation circuit 30, the plurality of capacitances 32 and the plurality of switches 34 are connected in parallel to one another. One end of each capacitance 32 is connected to the chopper amplifier circuit 31 with one node and the other end is connected to the corresponding switch 34.

FIG. 6 shows a construction of the reference voltage generation circuit 30 in which four capacitances 32a to 32d and four switches 34a to 34d are connected in parallel to one another, respectively. This construction of the reference voltage generation circuit 30 shown in FIG. 6 is one example, and the number of capacitances 32 and switches 34 is not limited to four but only has to be more than one.

In the reference voltage generation circuit 30 of the fourth preferred embodiment, the switch 33 controls the inflow of the input signal Vin and the switches 34 control the input signal Vin flowing to the plurality of capacitances 32, respectively. With the control of the switches 34, respective predetermined electric charges are held in the plurality of capacitances 32.

In the reference voltage generation circuit 30 of the fourth preferred embodiment, after the predetermined electric charges are held in the plurality of capacitances 32, all the switches 34 are brought into an ON state to establish connection among the plurality of capacitances 32, equating the electric charges held therein.

The reference voltage generation circuit 30 supplies a potential on the basis of the equated electric charges to the chopper amplifier circuit 31 as a slicer reference voltage. The chopper amplifier circuit 31 comprises an inverter 35 and a switch 36 connected in parallel to the inverter 35. The reference voltage generation circuit 30 of the fourth preferred embodiment does not also use the RC integration circuit which is shown in the background art. Therefore, even if the input signal Vin quickly changes, the reference voltage generation circuit 30 can adequately follow the change. Further, the reference voltage generation circuit 30 of the fourth preferred embodiment also has the plurality of capacitances 32 and does not need a large capacity for holding the slicer reference voltage.

Figure 7:
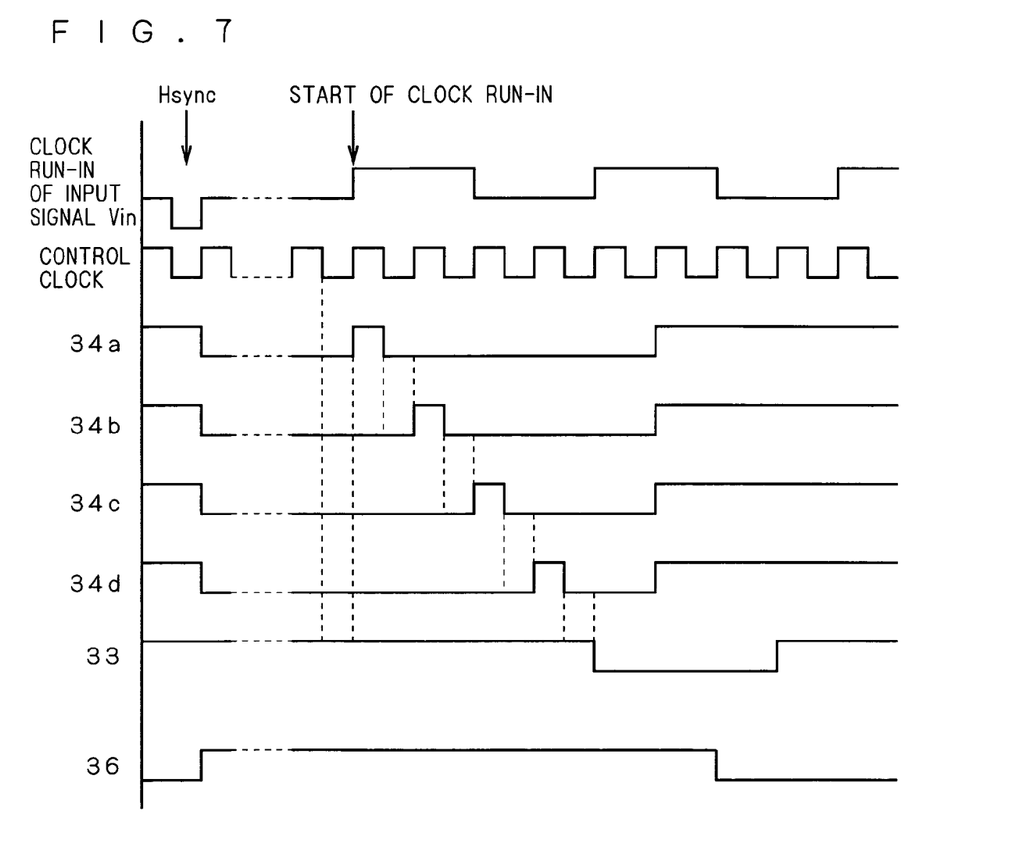
FIG. 7 is a timing chart of the data slicer in accordance with the fourth preferred embodiment of the present invention.

Next, discussion will be made on an operation of the data slicer (especially, the reference voltage generation circuit 30 of the fourth preferred embodiment). FIG. 7 is a timing chart of the data slicer in accordance with the fourth preferred embodiment of the present invention. The timing chart of FIG. 7 shows the clock run-in of the input signal Vin, the control clock for the switches 33, 34 and 36 and the respective states of the switches 33, 34 and 36. Since the construction of FIG. 6 includes four switches 34a to 34d, the respective states of the switches 34a to 34d are shown in the timing chart of FIG. 7.

The reference voltage generation circuit 30 of the fourth preferred embodiment drives the switches 34a to 34d so that each of these switches comes into an ON state once during one cycle of the clock run-in or several cycles. For such a driving, the control clock for the switches 33, 34 and 36 needs to have a frequency higher than the clock run-in. In the timing chart of FIG. 7, the control clock is set to have four cycles during one cycle of the clock run-in. The rise of the clock run-in is synchronized with the rise of the control clock. The switches 33 and 34 in the reference voltage generation circuit 30 and the switch 36 in the chopper amplifier circuit 31 are controlled on the basis of the control clock.

First, a H sync signal is inputted in the clock run-in of the input signal Vin. After the input of the Hsync signal, all the switches 34a to 34d are brought into an OFF state. At the same time, the switch 36 in the chopper amplifier circuit 31 is brought into an ON state. The switch 33 remains in the ON state. With such a control over the switches 33 34 and 36, the potential of an input point in the chopper amplifier circuit 31 (the point A in FIG. 6) is stabilized in half a power supply voltage (VDD) of the inverter 35.

Next, at the start of clock run-in, the switch 34a is brought into an ON state in synchronization with the control clock. With the switch 34a turned on, the capacitance 32a connected to the switch 34a holds electric charges on the basis of the input signal Vin. The capacitance 32a is charged with potential difference between half the power supply voltage (½ VDD) and the input signal Vin for half cycle of the control clock.

After the switch 34a comes into an OFF state, the switch 34b is brought into an ON state at the timing of rise of the control clock. With the switch 34b turned on, the capacitance 32b connected to the switch 34b holds electric charges on the basis of the input signal Vin. The capacitance 32b is charged with potential difference between the ½ VDD and the input signal Vin for half cycle of the control clock.

After the switch 34b comes into an OFF state, the switch 34c is brought into an ON state at the timing of rise of the control clock. With the switch 34c turned on, the capacitance 32c connected to the switch 34c holds electric charges on the basis of the input signal Vin. The capacitance 32c is charged with potential difference between the ½ VDD and the input signal Vin for half cycle of the control clock.

After the switch 34c comes into an OFF state, the switch 34d is brought into an ON state at the timing of rise of the control clock. With the switch 34d turned on, the capacitance 32d connected to the switch 34d holds electric charges on the basis of the input signal Vin. The capacitance 32d is charged with potential difference between the ½ VDD and the input signal Vin for half cycle of the control clock.

As discussed above, during the four cycles of the control clock (one cycle of the clock run-in), the switches 34a to 34d are brought into an ON state without overlap. The four switches are not necessarily driven in such an order as shown in the timing chart of FIG. 7, i.e., from the switch 34a to switch 34d, but may be driven in no particular order only if these switches are turned on once during predetermined timing (four cycles of the control clock in the fourth preferred embodiment) without overlap.

Next, the reference voltage generation circuit 30 of the fourth preferred embodiment turns off the switch 33 as shown in the timing chart of FIG. 7, to cut off the inflow of the input signal Vin. After the switch 33 is turned off, all the switches 34a to 34d are brought into an ON state.

With all the switches 34a to 34d turned on, all the capacitances 32a to 32d are connected to one another, to thereby equate the electric charges held in the capacitances 32a to 32d. A potential on the basis of the equated electric charges in the capacitances 32 to 32d is supplied to the chopper amplifier circuit 31 as a slicer reference voltage. In other words, the potential at the point B becomes a slicer reference voltage and the potential difference between the potential at the point A, which is a threshold voltage of the inverter 35, and the potential at the point B is accumulated in each of the capacitances 32a to 32d.

In the chopper amplifier circuit 31, by turning on the switch 33 of the reference voltage generation circuit 30 after turning off the switch 36, the potential difference between the potential at the point A and the potential of the input signal Vin at the point B is supplied to the inverter 35. The result of comparison between the slicer reference voltage and the input signal Vin is outputted to the inverter 35.

In summary of the above discussion, the data slicer of the fourth preferred embodiment performs the following driving method. First, the switch 36 in the chopper amplifier circuit 31 is brought into an ON state and all the plurality of switches 34a to 34d are brought into an OFF state (Step (I)). Next, during predetermined timing (during four cycles of the control clock in this preferred embodiment) after the start of input of the input signal Vin (at the start of the clock run-in), the plurality of switches 34a to 34d are so controlled as to individually come into an ON state without overlap, to thereby hold predetermined electric charges in the plurality of capacitances 32a to 32d, respectively (Step (II)). Subsequently, after Step (II), the switch 33 is brought into an OFF state (Step (III)). After Step (III), all the plurality of switches 34a to 34d are so controlled as to simultaneously come into an ON state, to thereby equate the electric charges held in the plurality of capacitances 32a to 32d (Step (IV)). After Step (IV), the switch 36 is brought into an OFF state and the switch 33 is brought into an ON state (Step (V)). The chopper amplifier circuit 31 compares a slicer reference voltage which is the potential on the basis of the predetermined electric charges equated in Step (IV) with the input signal Vin (Step (VI)).

The amount of predetermined electric charges held in each of the plurality of capacitances 32a to 32d depends on the capacity and the time for charge. The capacities of the capacitances 32a to 32d may be equal to one another or may be different with weighting.

Thus, the data slicer of the fourth preferred embodiment comprises the reference voltage generation circuit 30 for generating a reference voltage and the chopper amplifier circuit 31 for comparing the reference voltage with the input signal Vin. The reference voltage generation circuit 30 comprises the plurality of capacitances 32a to 32d which are connected in parallel to one another and connected to the chopper amplifier circuit 31 with a node at the point A, holding electric charges on the basis of the input signal Vin, the switch 33 for controlling the inflow of the input signal Vin and the plurality of switches 34a to 34d for controlling the respective connections between the switch 33 and the plurality of capacitances 32a to 32d. The plurality of switches 34a to 34d are controlled with predetermined timing where these switches 34a to 34d individually come into an ON state without overlap and further controlled with predetermined timing where all the switches 32a to 32d simultaneously come into an ON state. With such construction and operation, the data slicer can produce an effect of generating an appropriate slicer reference voltage since the reference voltage generation circuit 30 can adequately follow the change of the input signal even if the input signal quickly changes. Further, since the data slicer of the fourth preferred embodiment uses the chopper amplifier circuit 31 instead of the comparator 3, it is possible to achieve further size reduction in circuit scale of the data slicer.

In the data slicer of the fourth preferred embodiment, since the plurality of capacitances 32a to 32d have uniform capacity, it is possible to generate a potential on the basis of the average value of total amount of electric charges accumulated in the capacitances 32a to 32d as a slicer reference voltage.

Further in the data slicer of the fourth preferred embodiment, since the plurality of capacitances 32a to 32d can each have capacity which depends on predetermined weighting, it is possible to generate a potential on the basis of a desired amount of electric charges as a slicer reference voltage.

The Fifth Preferred Embodiment

It is also possible to achieve a construction in which the control clock selection circuit for the switches 33, 34 and 36 is additionally provided to the data slicer of the fourth preferred embodiment. Specifically, like in the invention discussed in the second preferred embodiment, the control clock selection circuit shown in FIG. 3 is provided in the data slicer shown in FIG. 6. For this reason, detailed discussion will be omitted.

Since the data slicer of the fifth preferred embodiment using the chopper amplifier circuit 31 further comprises the control clock selection circuit for changing the frequency of the control clock to be supplied to the plurality of switches 33, 34 and 36, it is possible to select an optimum frequency of the control clock in accordance with the video system and increase general versatility of the data slicer.

The Sixth Preferred Embodiment

It is also possible to achieve a construction in which the frequency detection unit and the control clock generation unit are additionally provided to the data slicer of the fourth preferred embodiment. Specifically, like in the invention discussed in the third preferred embodiment, the frequency detection unit 21 and the control clock generation unit 22 shown in FIG. 4 are provided in the data slicer shown in FIG. 6. For this reason, detailed discussion will be omitted.

Thus, since the data slicer of the sixth preferred embodiment using the chopper amplifier circuit 31 further comprises the frequency detection unit 21 for detecting the frequency of the clock run-in of the input signal Vin and the control clock generation unit 22 for generating the control clock to be supplied for the switches 33, 34 and 36 on the basis of the frequency detected by the frequency detection unit 21, it is possible to generate a slicer reference voltage on the basis of the control clock in conformity with the actual input signal Vin and therefore possible to increase the accuracy of the slicer reference voltage.

While the invention has been shown and described in detail, the foregoing description is in all aspects illustrative and not restrictive. It is therefore understood that numerous modifications and variations can be devised without departing from the scope of the invention.

What is claimed is:

1. A data slicer, comprising:

a reference voltage generation circuit for generating a reference voltage; and a chopper amplifier circuit for comparing said reference voltage with an input signal, wherein said reference voltage generation circuit comprises a plurality of capacitances connected in parallel to one another and connected to said chopper amplifier circuit with a second node, holding electrical charges on the basis of said input signal;

a first switch for controlling the inflow of said input signal; and a plurality of second switches for controlling the respective connections between said first switch and said plurality of capacitances, and wherein said plurality of second switches are controlled with predetermined timing where said second switches are individually brought into an ON state, and controlled with predetermined timing where all said second switches are brought into an ON state.

2. The data slicer according to claim 1, wherein said plurality of capacitances each have uniform capacity.

3. The data slicer according to claim 1, wherein said plurality of capacitances each have capacity which depends on predetermined weighting.

4. The data slicer according to claim 1, wherein a control clock serving as control timing for ON/OFF state is supplied for said first switch and said plurality of second switches, and said reference voltage generation circuit further comprises a control clock selection circuit for changing a frequency of said control clock.

5. The data slicer according to claim 1, further comprising:

a frequency detection unit for detecting a frequency of said input signal; and a control clock generation unit for generating a control clock serving as control timing for ON/OFF state which is supplied for said first switch and said plurality of second switches on the basis of said frequency detected by said frequency detection unit.

6. The data slicer according to claim 1, wherein said plurality of second switches are controlled with predetermined timing where said second switches are individually brought into an ON state without overlap, and controlled with predetermined timing where all said second switches are simultaneously brought into an ON state.

* * * * *